(12) United States Patent
Hosoya

(10) Patent No.: US 6,590,565 B2
(45) Date of Patent: Jul. 8, 2003

(54) KEYBOARD UNIT HAVING POP-UP KEY-TOPS AND ELECTRONIC APPARATUS INCORPORATING THE KEYBOARD UNIT

(75) Inventor: Ryo Hosoya, Fussa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 208 days.

(21) Appl. No.: 09/791,786

(22) Filed: Feb. 26, 2001

(65) Prior Publication Data

US 2001/0033269 A1 Oct. 25, 2001

(30) Foreign Application Priority Data

Apr. 11, 2000 (JP) .......................... 2000-109541

(51) Int. Cl.$^7$ ................................................. G09G 5/00
(52) U.S. Cl. ........................................ 345/168; 345/169
(58) Field of Search ........................... 345/168, 156, 345/169, 152, 158; 400/491; 200/5, 344, 345; 341/22

(56) References Cited

U.S. PATENT DOCUMENTS

| | | | | |
|---|---|---|---|---|
| 5,635,928 A | * | 6/1997 | Takagi et al. .................. 341/22 |
| 5,767,464 A | * | 6/1998 | Dyer et al. .................. 200/5 A |
| 5,812,116 A | * | 9/1998 | Malhi .......................... 345/168 |
| 5,909,210 A | | 6/1999 | Knox et al. .................. 345/168 |
| 6,068,416 A | * | 5/2000 | Kumamoto et al. ......... 400/491 |
| 6,087,604 A | * | 7/2000 | Suga et al. ................... 200/344 |
| 6,087,966 A | * | 7/2000 | Sato ............................. 341/22 |
| 6,094,191 A | * | 7/2000 | Watanabe et al. ............ 345/168 |
| 6,225,586 B1 | * | 5/2001 | Watanabe et al. ............ 200/344 |
| 6,236,003 B1 | * | 5/2001 | Suganami .................... 200/5 A |
| 6,366,275 B1 | * | 4/2002 | Lai .............................. 345/168 |

FOREIGN PATENT DOCUMENTS

JP          08-054964          2/1996

* cited by examiner

Primary Examiner—Vijay Shankar
Assistant Examiner—Nitin Patel
(74) Attorney, Agent, or Firm—Finnegan, Henderson, Farabow, Garrett & Dunner, L.L.P.

(57) ABSTRACT

A keyboard unit comprises a keyboard base and a number of key-tops. A switch in the form of a sheet is interposed between the keyboard base and the key-tops. The switch has a number of movable contacts arranged corresponding to the key-tops, and a number of stationary contacts opposed to the respective movable contacts. The key-tops are supported above the keyboard base by respective key-top support mechanisms such that they can move vertically. Each of the key-top support mechanisms includes first and second link levers pivotably connected to each other. The first link lever is made of a metal and has an elastically deformable pressing section that is formed integral therewith as one body. A number of elastically deformable load receiving sections are interposed between the respective pressing sections and the respective movable contacts.

12 Claims, 5 Drawing Sheets

KEYBOARD UNIT HAVING POP-UP KEY-TOPS AND ELECTRONIC APPARATUS INCORPORATING THE KEYBOARD UNIT

CROSS-REFERENCE TO RELATED APPLICATIONS

This application is based upon and claims the benefit of priority from the prior Japanese Patent Application No. 2000-109541, filed Apr. 11, 2000, the entire contents of which are incorporated herein by reference.

BACKGROUND OF THE INVENTION

The present invention relates to a keyboard unit having pop-up key-tops and an electronic apparatus incorporating the keyboard unit.

Recently, in the market involving portable computers, there is a demand for forming the portable computers thinner and more compact to facilitate to carry them. To satisfy the demand, it is an urgent necessity to make thin main components such as a main body having a keyboard unit, a liquid crystal display unit, etc.

A keyboard unit incorporated in the main body of a portable computer has a number of key-tops to be operated by the fingers of the operator. Each of the key-tops is vertically movably supported by a key-top support mechanism of a pantograph type located on a keyboard base. The key-top support mechanism has a pair of link levers. These link levers are assembled into an X-shaped structure, and connected so that they can pivot relative to each other. A sheet switch is provided on the keyboard base. This switch has a number of movable contacts and a number of stationary contacts. The movable contacts are opposed to the stationary contacts below the key-tops.

In a keyboard unit of this type, to realize comfortable input operability, it is necessary, when a finger has pushed a key-top, to enable the operator to clearly feel a click. To this end, the conventional keyboard unit incorporate an elastically deformable pressing member interposed between each key-top and the switch. This pressing member is formed of a flexible rubber material such as silicone rubber, and is cup- or dome-shaped such that it opens to the switch. Each pressing member always upwardly presses a corresponding key-top away from the switch. Upper portions of the pressing members form projections for pressing the respective movable contacts of the switch.

Accordingly, when a finger pushes a key-top, a corresponding pressing member is depressed to thereby cause the finger to feel a click, and the projection of the pressing member presses a corresponding movable contact of the switch. As a result, the movable contact is brought into contact with a corresponding stationary contact, thereby closing the switch. The keyboard unit, in turn, outputs an input signal indicating that a desired key-top has been pushed.

In a keyboard unit for a portable computer, it is necessary to secure the stroke amount of each key-top so as to cause the operator to clearly feel that each key-top has been pushed. However, the stroke amount of each key-top significantly influences the thickness of the keyboard unit. The larger the stroke amount, the thicker the keyboard unit. The increase of the stroke amount is a hindrance to the thinning of the computer.

A so-called pop-up keyboard unit is known as an improvement developed in light of the above. In this improvement, key-tops are depressed and superposed on the switch when the computer is not used, and are protruded upwardly only when the computer is used.

For example, Japanese Patent Application KOKAI Publication No. 8-54964 discloses an example of the pop-up keyboard unit. In this keyboard unit, cup- or dome-shaped pressing members are provided on the upper surface of the switch. The switch is supported on a keyboard base so that it can slide between a first position in which the pressing members are positioned below key-top support mechanisms, and a second position in which the pressing members are displaced from the key-top support mechanisms. While the liquid display unit is open, the switch is urged by a spring to the first position. When the liquid display unit is closed, the switch is forcibly slid from the first position to the second position.

When the switch is slid to the first position, the pressing members raise the key-top support mechanisms. Accordingly, the link levers of each key-top support mechanism upwardly pivot on portions thereof connected to the keyboard base, whereby the key-tops are kept in a position in which they are upwardly protruded above the switch by a desired amount.

When, on the other hand, the switch is slid to the second position, the pressing members are displaced from the key-top support mechanisms. Accordingly, the raise of the key-top support mechanisms by the pressing members is released. As a result, the link levers of each key-top support mechanism downwardly pivot on portions thereof connected to the keyboard base, whereby the key-tops are depressed. This structure enables thinning of the keyboard unit while securing the stroke amount of each key-top, which is necessary to depress it.

In the conventional keyboard unit, each pressing member for pressing a corresponding movable contact or causing the operator to feel a click, when a finger pushes a corresponding key-top, is a component separate from the key-top support mechanism. Therefore, the number of components incorporated in the keyboard unit is inevitably large, which results in high cost. Further, since it is necessary to provide the same number of pressing members as the key-tops on the switch, a lot of time and effort are required, which degrades the efficiency of assembly of the keyboard unit.

As an improvement for overcoming this, a keyboard unit is known, in which the link levers of a key-top support mechanism are formed of pressed component parts, and an elastically deformable tongue member for pressing a switch is formed integral with one of the link levers. In this case, the tongue member directly presses the switch when the link levers of the key-top are downwardly pivoted in accordance with the push operation of the key-top. This structure does not require the above-described pressing members of rubber, which results in cost reduction.

However, the tongue member formed of a metal plate has a higher rate of spring than the rubber pressing member, and hence has a strong spring force which causes the tongue member to try to maintain its initial state against a force occurring when the tongue member is brought into contact with the switch. This being so, the operator feels heavy touch when pushing a key-top. In other words, the input operability is degraded.

Furthermore, since the tongue member is formed integral with the link lever by press working, it is necessary to remake a mold for press working in order to change the rate of spring of the tongue member. Thus, it is difficult to change the rate of spring of the tongue member for improving the key touch obtained when pushing each key-top.

In addition, in the conventional pop-up keyboard unit, the flexible rubber pressing member is brought into contact with the key-top support mechanism each time the liquid crystal display unit is opened or closed. Accordingly, it is possible that the pressing member will be degraded or worn out in an early stage.

Also, the rubber pressing member generates a strong frictional force in a portion thereof connected to the key-top support mechanism. Accordingly, high resistance occurs when sliding the switch, with the result that each key-top cannot smoothly be raised or depressed.

BRIEF SUMMARY OF THE INVENTION

It is a first object of the invention to provide a keyboard unit and electronic apparatus of excellent operability, which enable the operator to have nice feeling when pushing each key-top, although they incorporate a structure in which pressing members made of a metal are arranged to press the respective movable contacts of a switch.

It is a second object of the invention to provide a keyboard unit and electronic apparatus of excellent operability, which can easily raise and depress each key-top with a small force of the operator while causing the operator to have nice feeling when they push each key-top.

To attain the first object, there is provided a keyboard unit according to a first aspect. This keyboard unit comprises: a keyboard base; a number of key-tops arranged above the keyboard base; a switch in the form of a sheet interposed between the keyboard base and the key-tops, the switch having a number of movable contacts arranged corresponding to the key-tops, and a number of stationary contacts opposed to the respective movable contacts; and a number of key-top support mechanisms located on the keyboard base and supporting the respective key-tops such that the key-tops can move vertically.

Each of the key-top support mechanisms includes first and second link levers pivotably connected to each other, the first and second link levers supporting each of the key-tops and being pivoted when the each key-top is pushed down, the first link lever being made of a metal and having an elastically deformable pressing section that is formed integral therewith as one body. A number of elastically deformable load receiving sections are interposed between the respective pressing sections of the first link levers and the respective movable contacts of the switch.

Further, to attain the first object, there is provided an electronic apparatus according to a second aspect. This electronic apparatus comprises a box-shaped main body; and a keyboard unit mounted on the main body. The keyboard unit includes: a keyboard base; a number of key-tops arranged above the keyboard base; a switch in the form of a sheet interposed between the keyboard base and the key-tops, the switch having a number of movable contacts arranged corresponding to the key-tops, and a number of stationary contacts opposed to the respective movable contacts; a number of key-top support mechanisms located on the keyboard base and supporting the respective key-tops such that the key-tops can move vertically, each of the key-top support mechanisms including first and second link levers pivotably connected to each other, the first and second link levers supporting each of the key-tops and being pivoted when the each key-top is pushed down, the first link lever being made of a metal and having an elastically deformable pressing section that is formed integral therewith as one body; and a number of elastically deformable load receiving sections interposed between the respective pressing sections of the first link levers and the respective movable contacts of the switch.

In each of the above-described structures, in a free state in which no key-top is pushed down, the pressing sections of the first link levers touch the load receiving sections of the switch. In other words, the first and second link levers are in a position remote from the switch, thereby raising the key-tops to their stand-by positions in which they protrude above the switch.

When a finger pushes down one of the key-tops, the first and second link levers of the one key-top downwardly pivot toward the switch. As a result of this pivoting, the pressing section of the first link lever is pressed against a corresponding load receiving section and hence elastically deformed. Accordingly, the force applied to the key-top to push it down is transmitted from the pressing section to a corresponding movable contact of the switch via the load receiving section. This movable contact is brought into contact with a corresponding stationary contact, whereby the switch is closed.

In the above structures, an elastically deformable load receiving section is interposed between the pressing section of each first link lever and the switch. Therefore, even if the rate of spring of the pressing section is made lower than in the prior art in order to make it easier to warp the pressing section, the elasticity of the load receiving section compensates the reduced spring rate of the pressing section. Therefore, although the pressing sections are formed of a metal, the key-tops can be pushed down with a small force, and clear click feeling can be obtained when the load receiving section deforms. Accordingly, the operator can obtain clear and comfortable feeling of pushing down each key-top. Thus, a comfortable input operation can be realized.

Further, the change of the elasticity of the load receiving section can vary the load characteristic obtained when each key-top is pushed down. Accordingly, it is not necessary to change the shape of the pressing section formed integral with the first link lever. Therefore, where the first link lever having the pressing section is formed by plate press working, the load characteristic can be easily changed without remaking a mold for press working.

To attain the second object, there is provided a keyboard unit according to a third aspect. This unit comprises: a keyboard base; a number of key-tops arranged above the keyboard base; a switch in the form of a sheet interposed between the keyboard base and the key-tops, the switch having a number of movable contacts arranged corresponding to the key-tops, and a number of stationary contacts opposed to the respective movable contacts; a number of key-top support mechanisms located on the keyboard base and supporting the respective key-tops such that the key-tops can move vertically.

Each of the key-top support mechanisms includes first and second link levers pivotably connected to each other, the first and second link levers supporting each of the key-tops and being pivoted when the each key-top is pushed down, the first link lever being made of a metal and having an elastically deformable pressing section that is formed integral therewith as one body. A movable sheet is interposed between the switch and the pressing sections of the first link levers, the movable sheet having a number of elastically deformable projections made of a metal, and being movable between a first position in which the projections are aligned with the respective pressing sections, and a second position in which the projections are not aligned with the pressing sections, the projections being brought into contact with the respective pressing sections when the movable sheet is in the first position.

To attain the second object, there is provided an electronic apparatus according to a fourth aspect. This apparatus comprises: a box-shaped main body; a keyboard unit mounted on the main body; and a lid supported by the main body such that it can pivot between a closed position in which it is folded on the keyboard unit from above, and an open position in which it stands behind the keyboard unit.

The keyboard unit includes: a keyboard base; a number of key-tops arranged above the keyboard base; a switch in the form of a sheet interposed between the keyboard base and the key-tops, the switch having a number of movable contacts arranged corresponding to the key-tops, and a number of stationary contacts opposed to the respective movable contacts; a number of key-top support mechanisms located on the keyboard base and supporting the respective key-tops such that the key-tops can move vertically, each of the key-top support mechanisms including first and second link levers pivotably connected to each other, the first and second link levers supporting each of the key-tops and being pivoted when the each key-top is pushed down, the first link lever being made of a metal and having an elastically deformable pressing section that is formed integral therewith as one body; and a movable sheet interposed between the switch and the pressing sections of the first link levers, the movable sheet having a number of elastically deformable projections made of a metal, and being movable between a first position in which the projections are aligned with the respective pressing sections, and a second position in which the projections are not aligned with the pressing sections, the projections being brought into contact with the respective pressing sections when the movable sheet is in the first position.

In each of the above-described structures, when the movable sheet is in the first position, projections provided thereon touch the respective pressing sections. In other words, the first and second link levers are in a position remote from the switch, thereby raising the key-tops to their stand-by positions in which they protrude above the switch.

When a finger pushes down one of the key-tops, the first and second link levers of the one key-top downwardly pivot toward the switch. As a result of this pivoting, the pressing section of the first link lever is pressed against a corresponding load receiving section and hence elastically deformed. Accordingly, the force applied to the key-top to push it down is transmitted from the pressing section to a corresponding movable contact of the switch via the load receiving section. This movable contact is brought into contact with a corresponding stationary contact, whereby the switch is closed.

When the movable sheet is shifted from the first position to the second position, the projections thereon are out of contact with the pressing sections. As a result, the first and second link levers downwardly pivot toward the switch due to their own weights, and are depressed. Thus, the key-tops are lowered to the switch, which means that the thickness of the keyboard unit is reduced.

In the above structures, an elastically deformable projection is interposed between the pressing section of each first link lever and the switch. Therefore, even if the rate of spring of the pressing section is made lower than in the prior art in order to make it easier to warp the pressing section, the projection compensates the reduced spring rate of the pressing section. Therefore, although the pressing sections are formed of a metal, the key-tops can be pushed down with a small force, and clear click feeling can be obtained when the projection deforms.

Further, since the pressing section of each first link lever and a corresponding projection of the movable sheet to be brought into contact with the pressing section are formed of a metal, a significant frictional force will not occur therebetween. This prevents each projection from being worn or damaged, and also prevents a great resistance from occurring when the movable sheet is slid. As a result, vertical motion of each key-top can be executed smoothly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A portable computer according to the embodiment of the invention will be described with reference to the accompanying drawings.

Figure 1:
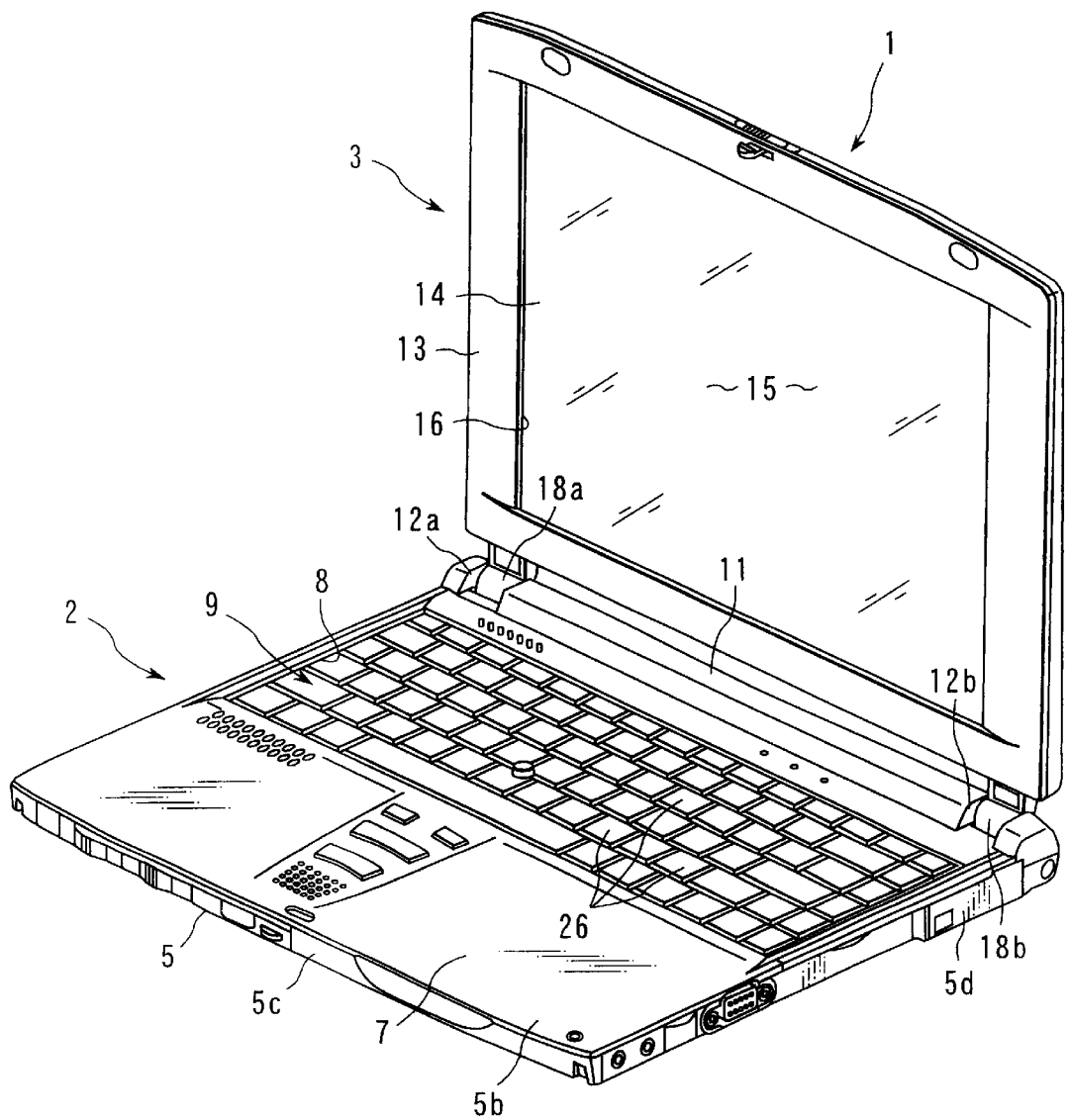
FIG. 1 is a perspective view illustrating a portable computer according to the embodiment of the invention.

FIG. 1 shows a notebook-sized portable computer 1 as an electric apparatus. The portable computer 1 has a main body 2 and a liquid crystal display unit 3 that also serves as a lid.

The main body 2 has a flat-box-shaped housing 5. The housing 5 is placed on an installation surface 4, for example, the top plate of a desk. The housing 5 has a bottom wall 5a, a top wall 5b, a front wall 5c, left and right side walls 5d and a rear wall 5e. The top wall 5b of the housing 5 includes a palm rest 7, a keyboard attachment section 8 and a projection 11. The palm rest 7 constitutes a front half portion of the housing 5 in its width direction. The keyboard attachment section 8 is located behind the palm rest 7. The keyboard attachment section 8 is in the form of a depression in the housing 5 and receives a keyboard unit 9.

The projection 11 upwardly projects behind the keyboard unit 9. The projection 11 extends over the entire width of the housing 5, and has its rear end integrated with the rear wall 5e of the housing 5. The projection 11 has a pair of display supports 12a and 12b that are separated from each other in the longitudinal direction of the projection 11. The display supports 12a and 12b are formed of recesses opening frontward, upward and rearward.

The liquid crystal display unit 3 includes a display housing 13 and a liquid crystal panel 14. The liquid crystal panel 14 has a display screen 15 for displaying images. The display screen 15 is exposed to the outside through a front opening 16 formed in the display housing 13.

The display housing 13 has a pair of legs 18a and 18b. The legs 18a and 18b extend from respective end portions of the display housing 13 to the display supports 12a and 12b. The legs 18a and 18b are attached to the housing 5 by respective hinge units 20.

Figure 3:
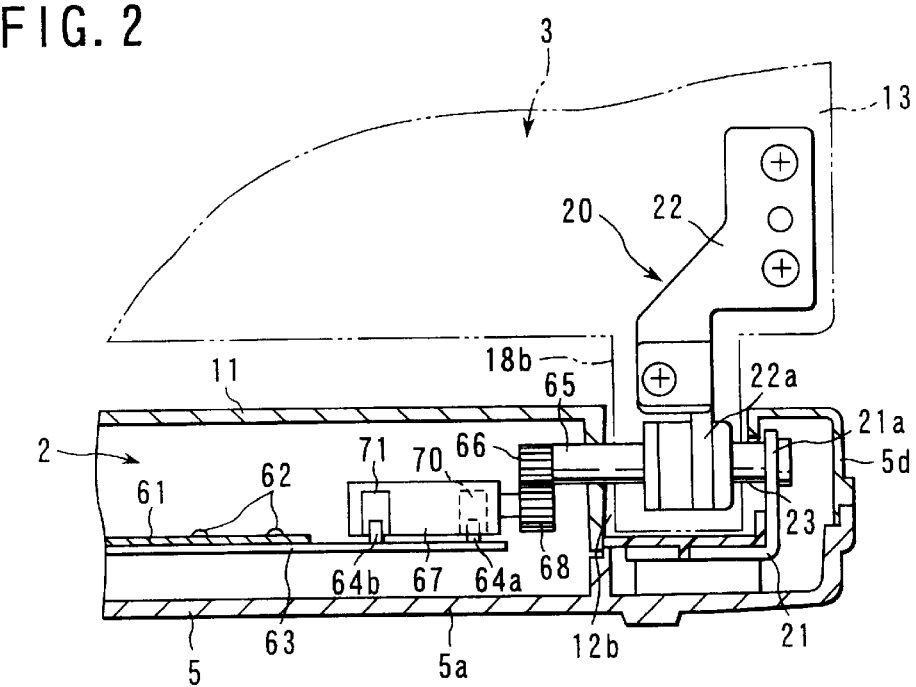
FIG. 3 is a sectional view the portable computer of FIG. 1, illustrating the positional relationship between a rotary drum engaged with a hinge shaft, and a driving pin incorporated in a movable plate.

FIG. 3 shows a connection between one leg 18b and the housing 5. As shown in FIG. 3, each hinge unit 20 includes a first hinge bracket 21, a second hinge bracket 22 and a hinge shaft 23. The first hinge bracket 21 is secured to the bottom wall 5a of the housing 5, and has an end 21a thereof directed to a side portion of the display support 12b. The second hinge bracket 22 is secured to the rear surface of the display housing 13, and has an end 22a thereof directed to the interior of the leg 18b. The hinge shaft 23 connects the end 21a of the first hinge bracket 21 to the end 22a of the second hinge bracket 22, and extends horizontally in the width direction of the housing 5. The hinge shaft 23 has a first end and a second end opposite to the first end. The first end of the hinge shaft 23 is supported by the end 21a of the first hinge bracket 21 so that it can rotate about its axis. The second end of the hinge shaft 23 is secured to the end 22a of the second hinge bracket 22.

Accordingly, the liquid crystal display unit 3 is supported by the housing 5 so that it can pivot on the hinge shaft 23 between a closed position in which the unit 3 is folded on the palm rest 7 and the keyboard unit 9, and an open position in which it stands and exposes the palm rest 7, the keyboard unit 9 and the liquid crystal panel 14.

Figure 2:
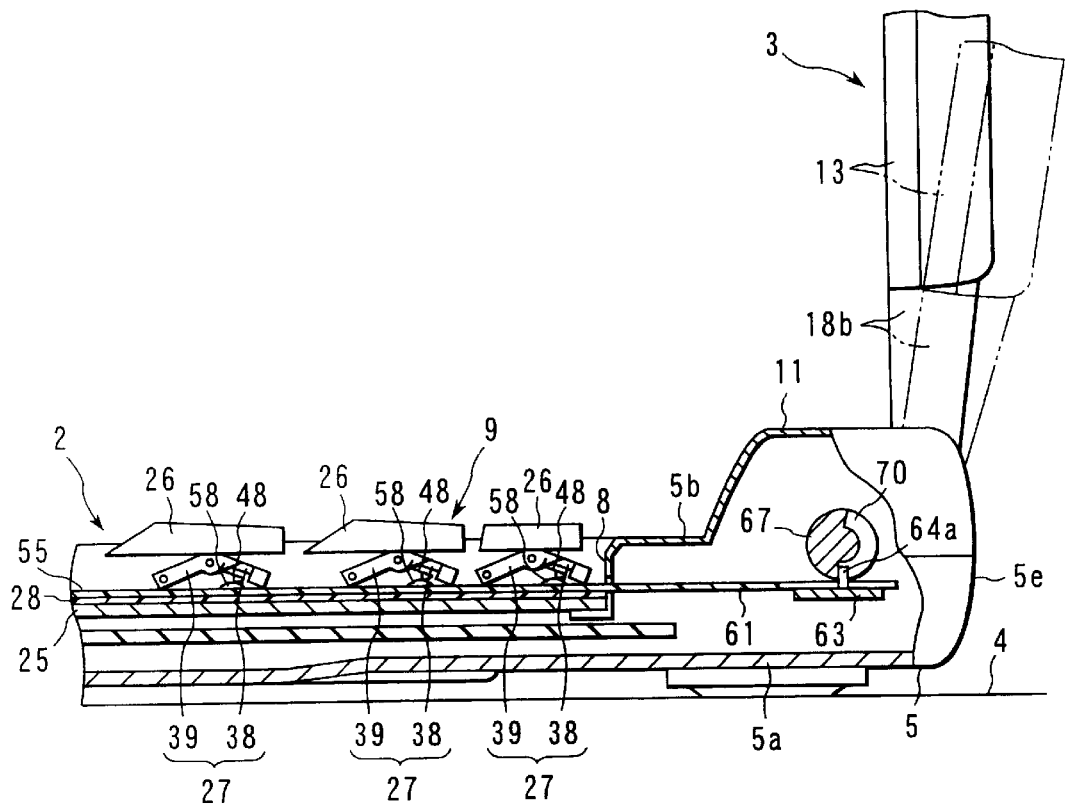
FIG. 2 is a sectional view of the portable computer of FIG. 1, illustrating a state in which a keyboard unit is incorporated in a housing.
Figure 4:
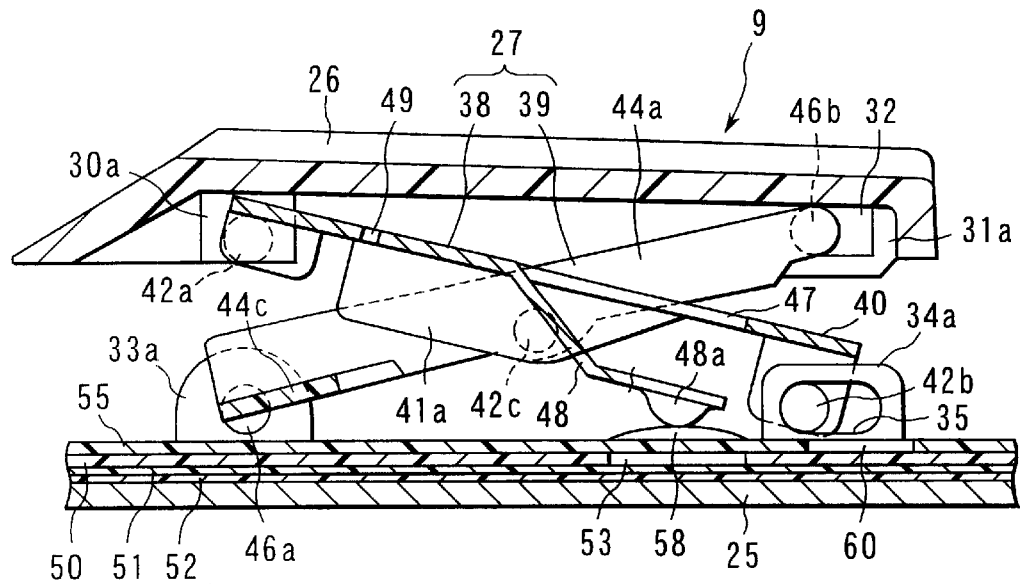
FIG. 4 is a sectional view illustrating a state in which a key-top is raised to a standby position.

As shown in FIG. 2 or 4, the keyboard unit 9 includes a keyboard base 25, a number of key-tops 26, a number of pantograph-type keyboard support mechanisms 27, and a flexible sheet switch 28.

The keyboard base 25 is made of a metal material such as an aluminum alloy, and is formed flat and platy so that it is fitted in the keyboard attachment section 8. The key-tops 26 are arranged above the keyboard base 25 in accordance with a predetermined standard, and have a size that enables a finger to press them easily.

Figure 5:
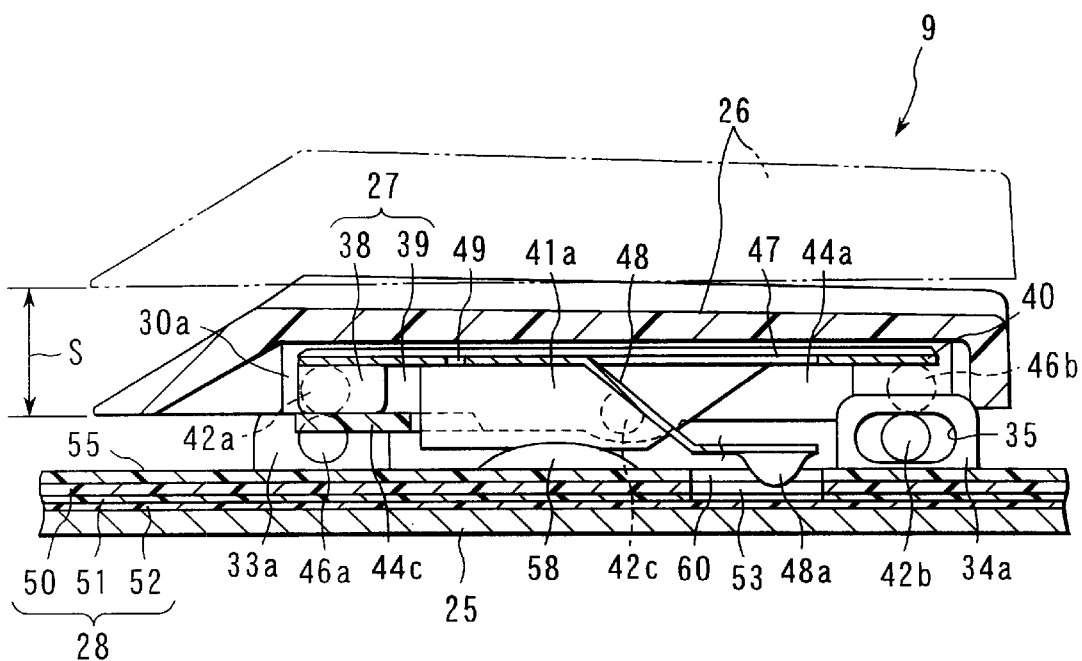
FIG. 5 is a sectional view of the keyboard unit, illustrating a state in which a key-top is shifted to a depressed position.
Figure 6:
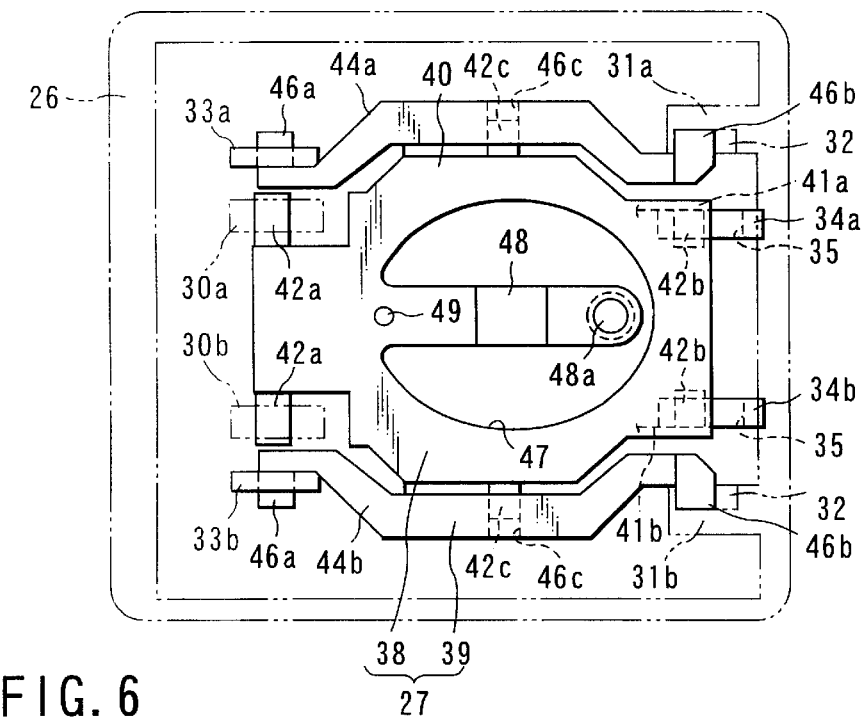
FIG. 6 is a plan view of the keyboard unit, illustrating the positional relationship between a key-top and a key-top support mechanism.

As shown in FIGS. 4–6, the key-tops 26 have their respective reverse surfaces opposed to the keyboard base 25. The reverse surface of each key-top 26 has a pair of first bearings 30a and 30b, and a pair of second bearings 31a and 31b. The first bearings 30a and 30b are arranged at the front end of each key-top 26 in its width direction. The second bearings 31a and 31b are arranged at the rear end of each key-top 26 in its width direction. The second bearings 31a and 31b each have a guide groove 32 extending in the depth direction of each key-top 26.

The keyboard base 25 has an upper surface opposed to each key-top 26. Pairs of third bearings 33a and 33b and pairs of fourth bearings 34a and 34b are provided on the upper surface of the keyboard base 25. Specifically, a pair of third bearings 33a and 33b and a pair of fourth bearings 34a and 34b are provided for each key-top 26. The third bearings 33a and 33b are arranged corresponding to the front end of each key-top 26 in its width direction. The fourth bearings 34a and 34b are arranged corresponding to the rear end of each key-top 26 in its width direction. The fourth bearings 34a and 34b each have a guide groove 35 extending in the depth direction of each key-top 26.

Figures 7A, 7B:
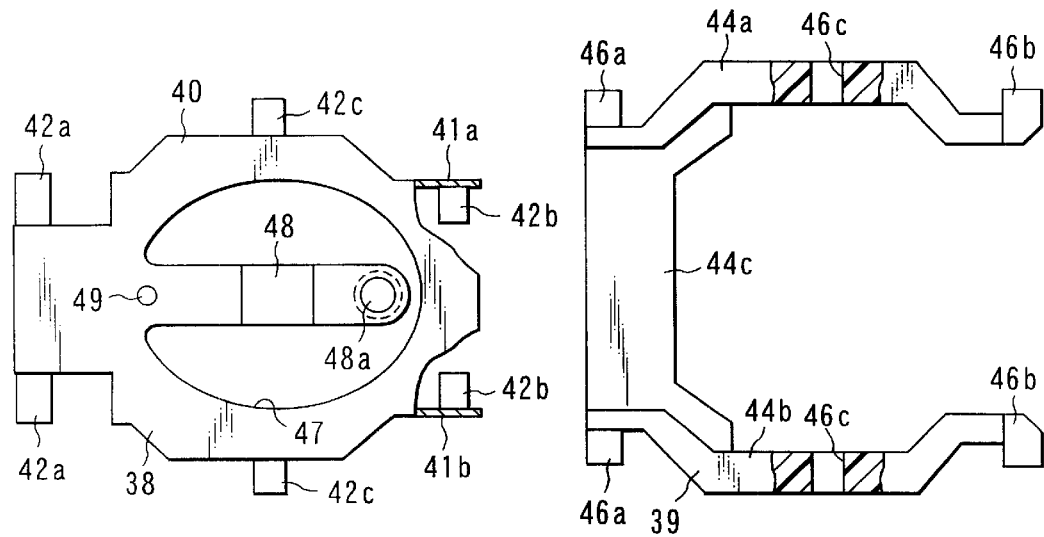
FIG. 7A is a plan view partly in section, illustrating a first link lever.
FIG. 7B is a plan view partly in section, illustrating a second link lever.

As shown in FIGS. 4–6, each key-top support mechanism 27 supports a corresponding key-top 26 above the keyboard base 25 so that each key-top 26 is vertically movable. Each key-top support mechanism 27 has a first link lever 38 and a second link lever 39. The first link lever 38 is formed of, for example, a product obtained by press working a metal plate such as a stainless steel plate. As shown in FIG. 7A, the first link lever 38 includes a platy lever main body 40 and a pair of flange sections 41a and 41b. The flange sections 41a and 41b are downwardly bent from respective opposite side edges of the lever main body 40. Accordingly, the flange sections 41a and 41b are opposed to each other in the width direction of the corresponding key-top 26, and extend in the depth direction thereof. The flange sections 41a and 41b each have first, second and third shafts 42a, 42b and 42c.

The first shaft 42a is provided on a front end portion of each flange section 41a or 41b, extending outwardly and horizontally from the front end portion. The first shafts 42a of the flange sections 41a and 41b are arranged coaxial. The second shaft 42b is provided on a rear end portion of each flange section 41a or 41b, extending horizontally and inwardly between the flange sections 41a and 41b. The second shafts 42b of the flange sections 41a and 41b are arranged coaxial. The third shaft 42c is provided on an intermediate portion of each flange section 41a or 41b between the front and rear end portions thereof, extending outwardly and horizontally from the intermediate portion. The third shafts 42c of the flange sections 41a and 41b are arranged coaxial.

The second link lever 39 is made of a synthetic resin. As shown in FIG. 7B, the second link lever 39 has a pair of arm sections 44a and 44b and a connecting section 44c. The arm sections 44a and 44b extend parallel to each other in the depth direction of each key-top 26. The connecting section 44c extends between the front ends of the arm sections 44a and 44b and connects them.

Each of the arm sections 44a and 44b has first and second shafts 46a and 46b and a pivot hole 46c. The first shaft 46a is provided on a front end portion of each arm section 44a or 44b and extends therefrom horizontally and outwardly. The first shafts 46a of the arm sections 44a and 44b are arranged coaxial. The second shaft 46b is provided on the rear end of each arm section 44a or 44b and extends therefrom horizontally and outwardly. The second shafts 46b of the arm sections 44a and 44b are arranged coaxial. The pivot hole 46c is formed in an intermediate portion of each arm section 44a or 44b between the front and rear ends thereof.

As is most clearly shown in FIG. 6, the first link lever 38 is interposed between the arm sections 44a and 44b of the second link lever 39. The third shafts 42c of the first link lever 38 are fitted in the pivot holes 46c of the arm sections 44a and 44b. This structure enables the first and second link levers 38 and 39 to vertically pivot, with the levers 38 and 39 crossed in the form of X.

As shown in FIGS. 4 and 6, the first shafts 42a of the first link lever 38 are supported in the first bearings 30a and 30b of each key-top 26 so that they can rotate about their axes. Further, the second shafts 46b of the first link lever 38 are slidably received in the respective guide grooves 35 of the keyboard base 25.

The first shafts 46a of the second link lever 39 are supported in the third bearings 33a and 33b of the keyboard base 25 so that they can rotate about their axes. Further, the second shafts 46b of the second link lever 39 are slidably received in the respective guide grooves 32 of each key-top 26.

In the above-described structure, in accordance with the movement of the first and second link levers 38 and 39 of each key-top 26, each key-top 26 can move between a standby position (shown in FIG. 4) in which it is raised above the keyboard base 25, and a depressed position (shown in FIG. 5) in which it is depressed along the keyboard base 25.

The lever main body 40 of the first link lever 38 has an opening 47, and a tongue section 48 as a pressing section. The opening 47 is formed circular in a central portion of the lever main body 40. The tongue section 48 is integrated with the lever main body 40 as one body by press working. The tongue section 48 extends from a front edge of the opening 47 to a rear portion of the lever main body 40, and is bent downwardly from the lever main body 40. Thus, the lever main body 40 supports the tongue section 48 so that the section 48 serves as a cantilever and can be elastically deformed in the direction of movement of each key-top 26.

A pressing portion 48a downwardly projecting toward the keyboard base 25 is formed integral with a distal end portion of the tongue section 48. A hole 49 is formed in a proximal end portion of the tongue section 48 for adjusting the rate of spring (strain characteristic) of the tongue section 48. The area of the hole 49 or the number of such holes can be changed in accordance with the required rate of spring.

Figure 8:
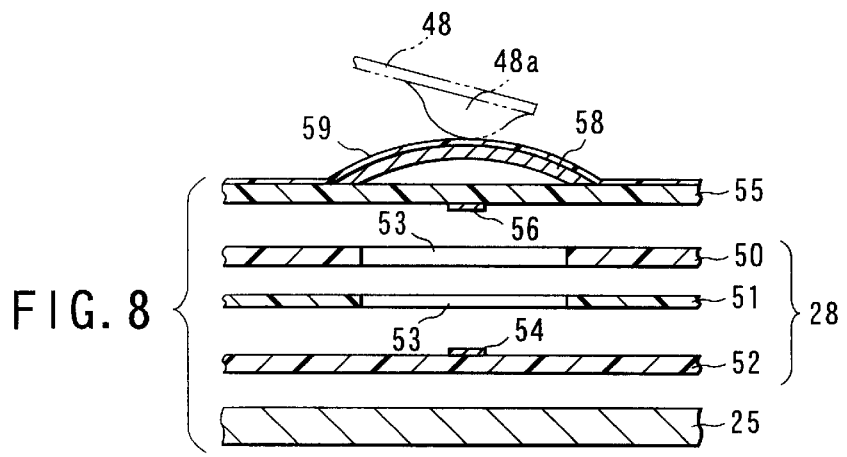
FIG. 8 is a sectional view illustrating a switch urged by an urging section of the first link lever.

As shown in FIGS. 4, 6 and 8, the switch 28 is secured on the upper surface of the keyboard base 25. The switch 28 has an upper sheet 50, a spacer sheet 51 and a lower sheet 52. Each sheet 50, 51 or 52 is formed of a flexible synthetic resin. The sheets 50–52 are stacked one on top of the other, and serve as the base of the switch 28.

This base has a number of first holes 53 formed in the upper sheet 50 and the spacer sheet 51. The lower sheet 52 serves as the bottom of the first holes 53. The first holes 53 are located below the pressing portion 48a of the tongue section 48. Stationary contacts 54 are printed on the lower sheet 52 at locations corresponding to the respective first holes 53.

The switch 28 includes a movable sheet 55. The movable sheet 55 is provided on the upper sheet 50, and is formed of a flexible synthetic resin. The movable sheet 55 has a lower surface opposed to the upper sheet 50, and a number of movable contacts 56 are printed on the lower surface. The movable contacts 56 are aligned with the first holes 53. Accordingly, the movable contacts 56 are opposed to the stationary contacts 54 through the first holes 53, with a space corresponding to the thickness of the spacer sheet 51 interposed therebetween.

As shown in FIGS. 4 and 5, the upper surface of the movable sheet 55 faces the key-tops 26. A number of projections 58 as load receiving sections are provided on the upper surface of the movable sheet 55. Each projection 58 is formed of a dome-shaped thin film plate, which appears disklike when viewed from above and has its top directed upward. Each projection 58 has elasticity and hence its top can be depressed. In a free state as shown in FIG. 8, the top of each projection 58 projects upward. Each projection 58 is secured on the movable sheet 55 by a protective sheet 59. The protective sheet 59 is made of a flexible synthetic resin and coated on the upper surface of the movable sheet 55.

The movable sheet 55 is supported on the keyboard base 25 so that it can slide between a first position shown in FIG. 4 and a second position shown in FIG. 5. When the movable sheet 55 is slid to the first position, each projection 58 shifts to a position just below the pressing portion 48a of a corresponding tongue section 48, thereby raising the pressing portion 48a. When, on the other hand, the movable sheet 55 is slid to the second position, each projection 58 shifts to a position in front of a corresponding pressing portion 48a, i.e. is separated therefrom. Accordingly, the raise of a corresponding pressing portion 48a by each projection 58 is released.

The movable sheet 55 has second holes 60 each located just behind a corresponding projection 58. When the movable sheet 55 is situated in the second position as shown in FIG. 5, each hole 60 is aligned with a corresponding first hole 53 of the switch 28 and opposed to the pressing portion 48a of a corresponding tongue section 48.

The movable sheet 55 is arranged to slide in synchronism with the opening or closing operation of the liquid crystal display 3. This structure will be described in more detail. As shown in FIG. 2, the movable sheet 55 has an extension 61 extending to a position behind the keyboard unit 9. The extension 61 is introduced into the housing 5, and has its rear end connected to a movable plate 63 via pins 62.

As shown in FIGS. 2 and 3, the movable plate 63 extends below the projection 11 in the width direction of the housing 5. The movable plate 63 has an end located adjacent to one display support 12b. The movable plate 63 has first and second driving pins 64a and 64b upwardly projecting therefrom. The first and second driving pins 64a and 64b are spaced from each other in the longitudinal direction of the movable plate 63.

Figure 9:
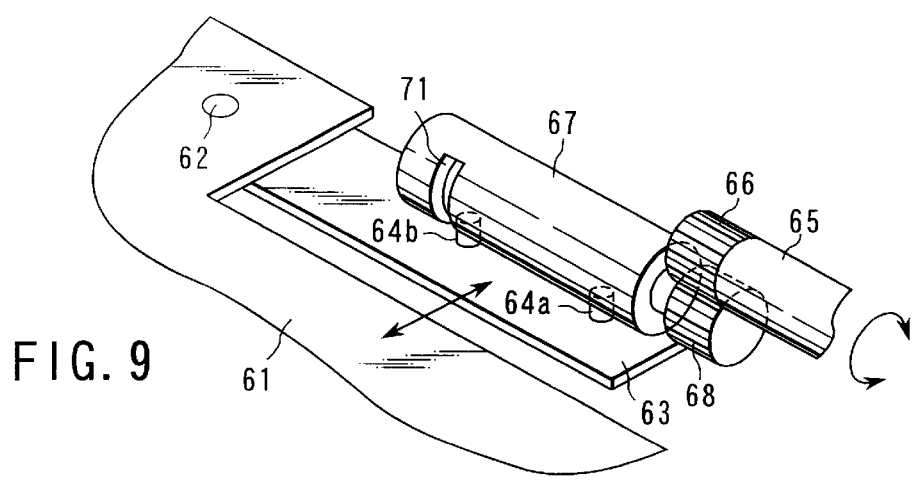
FIG. 9 is a perspective view showing the positional relationship between a rotary drum engaged with a hinge shaft, and a driving pin incorporated in a movable plate.

The hinge shaft 23 of one of the hinge units 20 has a rotary shaft section 65, which coaxially projects from the second end of the hinge shaft 23 toward the movable plate 63. One end of the rotary shaft section 65 is contained in the projection 11 and provided with a driving gear 66. The driving gear 66 is engaged with an input gear 68 incorporated in a rotary drum 67 shown in FIG. 9. The rotary drum 67 is located horizontally in the width direction of the housing 5, and supported by the bottom wall 5a of the housing 5 via a bracket (not shown).

Therefore, when the hinge shaft 23 is rotated about its axis in accordance with the opening/closing operation of the liquid crystal display unit 3, the rotary motion of the hinge shaft 23 is transmitted to the rotary drum 67 via the driving gear 66 and the input gear 68. As a result, the rotary drum 67 is rotated in a direction opposite to the direction of rotation of the hinge shaft 23.

The rotary drum 67 has first and second guide grooves 70 and 71 formed in its circumferential surface. Further, the first and second guide grooves 70 and 71 are separate from each other along the axis of the rotary drum 67 above the movable plate 63. The first and second driving pins 64a and 64b of the movable plate 63 are slidably received in the first and second guide grooves 70 and 71, respectively.

Figure 10A:
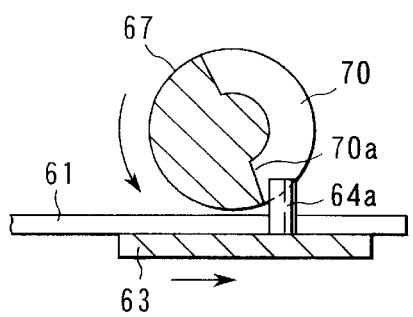
FIG. 10A is a sectional view illustrating a state in which a movable sheet is slid by the rotary drum to a first position.

As shown in FIG. 10A, the first guide groove 70 extends through 180° in the circumferential surface of the rear half of the rotary drum 67. The first guide groove 70 has one end 70a arranged to be engaged with the first driving pin 64a when the liquid crystal display unit 3 has reached a position immediately before its open position.

Figure 10B:
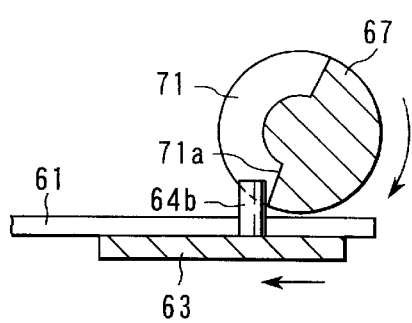
FIG. 10B is a sectional view illustrating a state in which the movable sheet is slid by the rotary drum to a second position.

As shown in FIG. 10B, the second guide groove 71 is formed through 180° in the circumferential surface of the front half of the rotary drum 67. The second guide groove 71 has one end 71a arranged to be engaged with the second driving pin 64b when the liquid crystal display unit 3 reaches a position immediately before its closed position.

A description will now be given of the key-top 26 raising/lowering operations, which occur in synchronism with the opening/closing operations of the liquid crystal display unit 3 in the portable computer 1 constructed as above.

When the liquid crystal display unit 3 is rotated to its open position, the rotary drum 67 rotates counterclockwise as indicated by the arrow in FIG. 10A. When the liquid crystal display unit 3 reaches a position immediately before the open position, the end 70a of the first guide groove 70 is brought into contact with the first driving pin 64a. As a result, the first driving pin 64a is pushed backwardly in the housing 5, and the movable plate 63 is backwardly pushed behind the keyboard unit 9. Thus, in the embodiment, the rotary drum 67 and the first and second driving pins 64a and 64b constitute converting means for converting the rotary motion of the liquid crystal display unit 3 into a linear motion to thereby transmit the rotary motion to the movable sheet 55.

After the movable sheet 55 is slid to a first position shown in FIG. 4 by the rotation of the rotary drum 67, the projection 58 on the movable sheet 55 is guided to the underside of the pressing portion 48a of the tongue section 48, thereby raising the pressing portion 48a. Accordingly, each first link lever 38 upwardly pivots on a corresponding second shaft 42b, and the corresponding second shaft 42b slides along a corresponding guide groove 35. In accordance with the pivoting operation of each first link lever 38, each second link lever 39 upwardly pivots on a corresponding first shaft 46a, and a corresponding second shaft 46b slides along a corresponding guide groove 32.

As a result, each first link lever 38 and a corresponding second link lever 39 stand up in the form of X using a corresponding third shaft 42c as its central point, whereby each key-top 26 is held in its standby position, which is at a level higher than the switch 28 by a desired stroke S.

When a finger pushes a desired key-top 26, held in the standby position, to its depressed position, the first and second link levers 38 and 39 of the key-top pivot downwardly. As a result, the second shafts 42b and 46b of the first and second link levers 38 and 39 slide along the guide grooves 35 and 32, respectively. When the first link lever 38 downwardly pivots, the tongue section 48 of the lever 38 is depressed and the pressing portion 48a of the section 48 is strongly urged against a projection 58 corresponding to the desired key-top 26. Accordingly, the upper sheet 50 of the switch 28 is pressed by the projection 58, thereby bringing a movable contact 56 and a stationary contact 54, which correspond to the desired key-top 26, into contact with each other. As a result, the switch 28 is closed, and a signal indicating that the desired key-top 26 has been pushed is output from the keyboard unit 9.

When the desired key-top 26 is released from the pushed state, its first and second link levers 38 and 39 are raised by the elastic forces of the projection 58 and the tongue section 48, thereby restoring the desired key-top 26 from the depressed position to the standby position. At the same time, the push of the upper sheet 50 by the tongue section 48 is also released, the sheet 50 is restored to its original state by its own restoring force. As a result, the movable contact 56 is separated from the stationary contact 54, thereby opening the switch 28.

When the liquid crystal display unit 3 is rotated from the open position to the closed position, the rotary drum 67 rotates clockwise as indicated by the arrow in FIG. 10B. Accordingly, the one end 70a of the first guide groove 70 shifts away from the first driving pin 64a, while the one end 71a of the second guide groove 71 approaches the second driving pin 64b. When the liquid crystal display unit 3 has reached a position immediately before the closed position, the one end 71a of the second guide groove 71 comes in contact with the second driving pin 64b. As a result, the second driving pin 64b and the movable plate 63 are pushed forwardly in the housing 5.

Accordingly, the movable sheet 55 slides to a second position shown in FIG. 5, where each projection 58 on the movable sheet 55 shifts to a position before the pressing portion 48a of a corresponding tongue section 48. As a result, the push of each pressing portion 48a by a corresponding projection 58 is released, and corresponding first and second link levers 38 and 39 downwardly pivot due to their own weights.

Thus, the first and second link levers 38 and 39 are horizontally folded along the movable sheet 55. In this state, the second holes 60 of the movable sheet 55 are aligned with the first holes 53 of the switch 28. The pressing portion 48a of the tongue sections 48 are fitted in the aligned first and second holes 53 and 60. Accordingly, the key-tops 26 are held in their depressed positions, which means that the thickness of the keyboard unit 9 is reduced by an amount corresponding to the stroke S of the key-tops 26.

In the above-described keyboard unit 9, each elastically deformable tongue section 48 downwardly extending from a corresponding first link lever 38 is formed integral therewith as one body by plate press working, and an elastic dome-shaped projection 58 is interposed between the pressing portion 48a of each tongue section 48 and the switch 28. Therefore, when a finger pushes a key-top 26 from the standby position to the depressed position, the tongue section 48 is strongly urged against a corresponding projection 58 and hence upwardly elastically reflexed. At the same time, the projection 58 is elastically depressed in accordance with the pressing force applied thereto by the pressing portion 48a.

Therefore, even if the rate of spring of the tongue section 48 is set at a value lower than in the prior art in order to make it easier to warp it, the reduced spring rate of the tongue section 48 is compensated by the projection 58. This enables each key-top 26 to be pushed with a small force although its tongue section 48 is formed of a metal, and also enables the operator to clearly feel a click when the projection 58 is depressed.

This being so, the operator can feel the push of each key-top 26 in a reliable manner, and can have a nice feeling when a finger has pushed each key-top 26. Thus, comfortable input operation can be realized.

Moreover, the load characteristic of each key-top 26, which shows when each key-top 26 is pushed, can be changed by changing the projection amount of each projection 58 or its shape. Accordingly, when changing the load characteristic, it is not necessary to change the shapes of the first link lever 38 and the tongue section 48. This means that the load characteristic can be easily changed without remaking a mold for press-working the first link lever 38.

In addition, the second link lever 39 linked to the first link lever 38 is formed of a synthetic resin. Therefore, when the first and second link levers 38 and 39 of each key-top 26 touch each other while each key-top 26 is operated, the second link lever 39 made of a synthetic resin softer than a metal is shaved by the first link lever 38. This means that no metal particles will occur while the key-top support mechanism 27 repeats its vertical motion.

In other words, if the first and second link levers 38 and 39 are both formed of a metal, it is possible that electrically conductive metal particles will be generated from rasping portions of the levers. If such metal particles enter between each stationary contact 54 and a corresponding movable contact 56, it is possible that these contacts will be short-circuited undesirably. Since, however, the second link levers 39 are formed of a synthetic resin in this embodiment, no conductive metal particles will be generated from rasping portions of the link levers 38 and 39. By virtue of this structure, short-circuiting due to metal particles can be avoided in the embodiment.

Furthermore, in the keyboard unit 9 constructed as above, the projections 58 for pivoting the first link levers 38 are each formed of an elastic thin metal plate. Accordingly, no great frictional force will occur in contact portions of each projection 58 and the pressing portion 48*a* of a corresponding tongue section 48. This being so, in the embodiment, the projections 58 can be prevented from being worn out or damaged, as compared with the conventional case where each key-top 26 is raised by a dome-shaped or cup-shaped pressing body made of rubber. At the same time, resistance that occurs when sliding the movable sheet 55 between the first and second positions can be minimized, thereby enhancing the operability of each key-top 26 when raising it to the standby position or lowering it to the depressed position.

The invention is not limited to the above-described embodiment, but can be modified in various ways without departing from its scope.

For example, in the embodiment, the movable sheet is slid between first and second positions by a rotary drum that rotates in accordance with the rotation of a hinge shaft. However, the invention may be modified, for example, such that the movable sheet is always urged toward the first position by a spring, and is forcibly returned, when the liquid crystal display unit is rotated to its closed position, from the first position to the second position by a cum that operates in synchronism with the opening/closing operations of the unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A keyboard unit comprising:
   a keyboard base;
   a plurality of key-tops arranged above the keyboard base;
   a plurality of support mechanisms located on the keyboard base and supporting respective key-tops such that the key-tops can move vertically, each of the support mechanisms including first and second link levers pivotably connected to each other, the first and second link levers supporting each of the key-tops and being pivoted when said each key-top is pushed down, the first link lever being made of a metal and having an elastically deformable pressing section formed integral therewith as one body; and a switch in a form of a sheet interposed between the keyboard base and the key-tops, the switch including a plurality of movable contacts arranged corresponding to the key-tops, a plurality of stationary contacts opposed to respective movable contacts, and a movable sheet having the movable contacts, the movable sheet further having a plurality of deformable receiving sections and being movable between a first position in which the receiving sections push up respective pressing sections of the first link levers, and a second position in which the receiving sections separate from the respective pressing sections, the receiving sections being interposed between the respective pressing sections of the first link levers and the respective movable contacts when the movable sheet is in the first position.

2. The keyboard unit according to claim 1, wherein the second link lever is formed of a synthetic resin.

3. The keyboard unit according to claim 1, wherein the receiving sections are each formed of a dome-shaped spring material.

4. The keyboard unit according to claim 1, wherein the switch includes a base, which is in a form of a sheet and on which the movable sheet is provided, the base having first holes formed corresponding to the pressing sections of the first link levers, and the movable sheet having second holes to be aligned with the first holes when the movable sheet is in the second position.

5. The keyboard unit according to claim 4, wherein the base has the stationary contacts opposed to the respective movable contacts through the first holes when the movable sheet is in the first position.

6. A keyboard unit comprising:
   a keyboard base;
   a plurality of key-tops arranged above the keyboard base;
   a switch in a form of a sheet interposed between the keyboard base and the key-tops, the switch having a plurality of movable contacts arranged corresponding to the key-tops, and a plurality of stationary contacts opposed to respective movable contacts;
   a plurality of support mechanisms located on the keyboard base and supporting respective key-tops such that the key-tops can move vertically, each of the support mechanisms including first and second link levers pivotably connected to each other, the first and second link levers supporting each of the key-tops and being pivoted when said each key-top is pushed down, the first link lever being made of a metal and having an elastically deformable pressing section formed integral therewith as one body; and
   a movable sheet interposed between the switch and the pressing sections of the first link levers, the movable sheet having a plurality of elastically deformable projections made of a metal in positions corresponding to respective movable contacts, and being movable between a first position in which the projections are aligned with respective pressing sections, and a second position in which the projections are not aligned with the pressing sections, the projections being brought into contact with the respective pressing sections when the movable sheet is in the first position.

7. The keyboard unit according to claim 6, wherein the projections are each formed of a dome-shaped spring material and held by the movable sheet with a protective sheet of a synthetic resin interposed therebetween.

8. The keyboard unit according to claim 7, wherein each of the first link levers has a lever main body, the lever main body and a corresponding one of the pressing sections being formed integral as one body by executing press working on a metal plate.

9. The keyboard unit according to claim 8, wherein the pressing section of each of the first link levers has a pressing portion to be brought into contact with a corresponding one of the projections.

10. An electronic apparatus comprising:

a main body; and a keyboard unit mounted on the main body, wherein the keyboard unit includes:
 a keyboard base;
 a plurality of key-tops arranged above the keyboard base;
 a plurality of support mechanisms located on the keyboard base and supporting respective key-tops such that the key-tops can move vertically, each of the support mechanisms including first and second link levers pivotably connected to each other, the first and second link levers supporting each of the key-tops and being pivoted when said each key-top is pushed down, the first link lever being made of a metal and having an elastically deformable pressing section formed integral therewith as one body; and
 a switch in a form of a sheet interposed between the keyboard base and the key-tops, the switch including a plurality of movable contacts arranged corresponding to the key-tops, a plurality of stationary contacts opposed to respective movable contacts, and a movable sheet having the movable contacts, the movable sheet further having a plurality of deformable receiving sections and being movable between a first position in which the receiving sections push up respective pressing sections of the first link levers, and a second position in which the receiving sections separate from the respective pressing sections, the receiving sections being interposed between the respective pressing sections of the first link levers and the respective movable contacts when the movable sheet is in the first position.

11. The electronic apparatus according to claim 10, further comprising a display unit supported by the main body such that the display unit can pivot between a closed position in which the display unit is adjacent to the keyboard unit, and an open position in which the display unit is spaced apart from the keyboard unit.

12. An electronic apparatus comprising:

a main body;

a keyboard unit mounted on the main body; and a display unit supported by the main body such that the display unit can pivot between a closed position in which the display unit is adjacent to the keyboard unit, and an open position in which the display unit is spaced apart from the keyboard unit, wherein the keyboard unit includes:
 a keyboard base;
 a plurality of key-tops arranged above the keyboard base;
 a switch in a form of a sheet interposed between the keyboard base and the key-tops, the switch having a plurality of movable contacts arranged corresponding to the key-tops, and a plurality of stationary contacts opposed to respective movable contacts;
 a plurality of support mechanisms located on the keyboard base and supporting respective key-tops such that the key-tops can move vertically, each of the support mechanisms including first and second link levers pivotably connected to each other, the first and second link levers supporting each of the key-tops and being pivoted when said each key-top is pushed down, the first link lever being made of a metal and having an elastically deformable pressing section formed integral therewith as one body;
 a movable sheet interposed between the switch and the pressing sections of the first link levers, the movable sheet having a plurality of elastically deformable projections made of a metal in positions corresponding to respective movable contacts, and being movable between a first position in which the projections are aligned with respective pressing sections, and a second position in which the projections are not aligned with the pressing sections, the projections being brought into contact with the respective pressing sections when the movable sheet is in the first position; and
 a conversion mechanism for converting pivoting motion of the display unit into linear motion of the movable sheet, the conversion mechanism sliding the movable sheet to the second position when the display unit is pivoted to the closed position, and sliding the movable sheet to the first position when the display unit is pivoted to the open position.

* * * * *